United States Patent Office 3,042,641
Patented July 3, 1962

3,042,641
FOUNDRY MOLDING COMPOSITION CONTAINING A POLYALKYLENIMINE
Theo John West, Concord, and John L. Dewey, Pleasant Hill, Calif., assignors to The Dow Chemical Company, Midland, Mich., a corporation of Delaware
No Drawing. Filed Oct. 30, 1959, Ser. No. 849,739
3 Claims. (Cl. 260—29.2)

This invention relates to foundry mold and core sand compositions and more particularly to additaments for improving molding properties of such sands.

Conventional molding sands are prepared by adding to a classified sand which may be of a washed, crude or reclaimed variety, a clay such as bentonite, fire clay or a combination of such clays and the like, and a critically controlled amount of water. It is also common practice to employ an organic binder such as cereal, dextrine, and the like. Deficiencies in the molding and working properties of the foregoing general type of molding compositions have presented a constant challenge to the foundry industry.

In attempts to meet this challenge the foundry industry has evolved numerous variations in foundry sand compositions with respect to the binder employed but it has been a general result that such changes have improved certain molding characteristics while degrading others. For example, a high degree of flowability is desirable in mold forming operations in order to obtain the complete filling of all pattern recesses as quickly as possible but common experience has shown that an increase in flowability is accompanied by a decrease in permeability of the final rammed or tamped product. In a similar manner increases in flowability of a particular composition are usually attended by decreases in green compressive strength. The present invention not only does not introduce such associated deleterious effects with an improvement in flowability but rather it achieves a joint improvement in all of these properties in the same mold composition. In addition, foundry molding sand compositions formulated in accordance with the present invention have desirable deformation characteristics.

It is an object of this invention to provide an improved foundry sand composition. Another object is to provide a foundry sand composition with improved higher flowability, green hardness and permeability. Still another object is to provide a foundry sand composition having desirable deformation characteristics. Other objects will become apparent hereinafter as the invention is described.

The present invention involves incorporating into foundry molding and compositions, as binders, certain water soluble polyalkylenimines containing in combined form monomers selected from the group consisting of ethylenimine, 1,2-propylenimine, 1,2-butylenimine, 2,2-dimethylethylenimine, 2,2,3-trimethylethylenimine and 2,2-dimethyl-3-n-propylethylenimine. Also operable are N-substituted derivatives and salts of such polymers so long as water solubility of the polymer is maintained. Examples of such materials are the N-methyl substituted derivatives and the sulfate, nitrate, chloride and bromide salts of such polymers.

Methods of preparation and sources of the foregoing monomers and polymers are described in Jones, Journal of Organic Chemistry, vol. 9, pages 484 to 499 (1944). The polyalkylenimines employed in the present invention may have molecular weights as low as 500 but a preferred weight ranges from about 10,000 to about 150,000.

Preferably, the polymers of this invention are employed in amounts ranging from .005 to 1 percent by weight of the total molding composition. Good results are obtained when employing these polymers in the amount of about 0.02–0.1 percent of the total composition mass. Such polymers can also be employed in compositions with other binder materials but in such instances, the beneficial effects may be substantially decreased by the presence of such other binder materials.

In carrying out the present invention, the polymeric material of this invention is added to an admixture of foundry sand, clay and water by any suitable means such as the conventional mulling and mixing equipment employed in foundries. The polymer may be added in an aqueous solution, generally about a 2 percent solution, or as a fine powder. In certain instances where particular improvement of the foundry sand composition as regards hot strength and dry shear strength is desirable, a small amount of a suitable finely divided inorganic salt is added to the foregoing basic composition. Suitable inorganic salts are the sodium, potassium, calcium, and ammonium salts of the oxy acids of phosphorus and the sodium, potassium, calcium and barium salts of the oxy acids of sulfur.

Once a uniform and homogeneous molding composition has been prepared by thorough mulling and mixing of the aforementioned ingredients, it is ready for application in mold patterns. It is poured or forced under pressure into such patterns and rammed or tamped while in place sufficiently to completely fill pattern recesses. The pattern is then removed and the green mold, which may be dried or baked, if necessary, is ready for use.

On the basis of 100 parts of a foundry molding composition contemplated as the base for the additament of the present invention, about 85 to 96 parts are sand, 2 to 8 parts are clay and 1 to 5 parts are water. The sand employed can be any of the standard foundry sands of the washed, shear or reclaimed varieties. If reclaimed sand is used, the beneficial effect of the polymeric additive of the invention may be diminished so long as there is present residual organic binders such as cereal, dextrine, and the like. As the sand containing such residual binders is reused, more and more of these binders will be burned out and greater benefits deriving from the polymeric additive will be realized. The clay employed is generally one of the bentonite variety but frequently fire clays are also used individually and in conjunction with the bentonite. Water is a variable, which in conventional practice is extremely critical, but the use of the polymeric binder substantially obviates his problem so that water tolerance varies from a minimum of about 1 percent to as much as 8 percent by weight of the mold composition.

The following terms are defined according to American Foundrymen's Society (hereinafter referred to as "A.F.S.") standards and they represent various quality criteria of foundry molding compositions.

The term "flowability" as used in the following examples is defined as the property of the foundry molding composition which determines whether the composition will flow readily in conveyers, fill pattern recesses and flow in any direction against pattern surfaces, under pressure. The reported figures are in percentage flowability as obtained from an A.F.S. standard flowability indicator attached to a standard A.F.S. sand rammer, the flowability being recorded after a specified amount of ramming. The term "green hardness" is defined as the resistance offered by the surface of a green mold to deformation in a small area. This measurement was made with a Harry W. Dietert Company green hardness tester No. 473. The term "permeability" as used herein refers to the physical property which determines the ability of gases to flow through molded masses of foundry molding compositions. Permeability tests were made with a Harry W. Dietert Company permmeter according to A.F.S. standard permeability procedure. The term "deformation" refers to a change in linear dimensions of a foundry molding composition test specimen when it is subjected to an applied stress. In the following examples the stress applied was compressive and the deformation is the amount that the cylinder body of the molding composition is decreased in inches of length. This measurement was taken with a deformation and toughness attachment on a Universal sand strength machine. Lastly, the term "green shear strength" represents in pounds per square inch of a cross-sectional area, the maximum shear stress which a foundry sand mixture, in its green state, is capable of withstanding without deformation. These measurements were taken on a Universal sand strength machine.

In a representative operation illustrative of the present invention, a foundry molding sand composition was prepared without a binder by thoroughly mulling 920 parts by weight of A.F.S. 510 sand (fresh Portage, Wisconson, sand), 40 parts by weight of western bentonite and 40 parts by weight of water. To one portion (hereinafter designated "cereal standard") of this mixture was added a conventional cereal binder at a rate of 20 pounds per ton. To a second portion was added polyethylenimine at a rate of 1 pound per ton as a 2 percent solution. Each portion was again thoroughly mulled and from each portion cylindrical test specimens 2 inches in diameter were formed according to standard testing procedure with A.F.S. standard equipment. Since the extent of ramming has a very definite effect on molding characteristics exhibited by the composition, it is necessary that comparative studies be made upon specimens which have been subjected to equivalent ramming. As indicated in the following table, test specimens were manufactured at the 3d and 5th ram levels. The accumulated compartive data obtained on specimens from the foregoing test formulations is set out in tabular form below with the net effective difference for the additament of this invention over the standard cereal formulation being indicted in the bottom row.

| | Rams | Flow. | Green Hard. | Perm. | Deformation Inches | Green Shear Str. |
|---|---|---|---|---|---|---|
| Cereal Standard | 3 | ------ | 75 | 87 | .035 | 1.6 |
| | 5 | 79 | 80 | 75 | .045 | 1.8 |
| Polyethylenimine | 3 | ------ | 80 | 99 | .015 | 1.7 |
| | 5 | 83 | 85 | 82 | .020 | 1.9 |
| Net Change Polythylenimine | 5th | +4 | +5 | +7 | −.025 | +1 |

From the foregoing results it is seen that flowability, green hardness, permeability and green shear strengths are all favorably improved over a standard cereal formulation. Furthermore, deformation is reduced to a desirable range of values. See Heine and Rosenthal, Principles of Metal Casting, McGraw-Hill Book Company, Inc. (1955), p. 89.

In a similar manner to that of the foregoing example comparable improvements are achieved by substituting other polyalkylenimines for the polyethylenimine described above, containing in combined form monomers selected from the group consisting of 1,2-propylenimine, 1,2-butylenimine, 2,2-dimethylethylenimine, 2,2,3-trimethylethylenimine and 2,2-dimethyl-3-n-propylethylenimine.

It is apparent from the foregoing description of this invention that various modifications can be made without depatring from the spirit and scope thereof, and the invention is to be limited only as defined in the claims as read in light of the specification.

We claim:
1. A foundry molding composition comprising foundry sand, clay, water, and as an essential additament, 0.005 to 1 percent by weight of a water-soluble polyalkylenimine having a molecular weight of at least 500 and being polymerized from at least one monomer selected from the group consisting of ethylenimine, 1,2-propylenimine, 1,2-butylenimine, 2,2-dimethylethylenimine, 2,2,3-trimethylethylenimine and 2,2-dimethyl-3-n-propylethylenimine.

2. A foundry molding composition comprising foundry sand, clay, water and as an essential additament 0.005 to 1 percent by weight of polyethylenimine having a molecular weight of at least 500.

3. In a foundry molding composition comprising a foundry sand, clay, water and other additaments, the improvement which comprises adding a water-soluble polyalkylenimine having a molecular weight of at least 500 and being polymerized from at least one monomer selected from the group consisting of ethylenimine, 1,2-propylenimine, 1,2 - butyenimine, 2,2 - dimethylethylenimine, 2,2,3-trimethylethylenimine and 2,2-dimethyl-3-n-propylethylenimine.

References Cited in the file of this patent
UNITED STATES PATENTS

| | | |
|---|---|---|
| 2,829,982 | Hoyt | Apr. 8, 1958 |
| 2,933,416 | Haakh et al. | Apr. 19, 1960 |

FOREIGN PATENTS

| | | |
|---|---|---|
| 729,057 | Great Britain | May 4, 1955 |